United States Patent
Kugel et al.

(10) Patent No.: US 8,611,255 B2
(45) Date of Patent: Dec. 17, 2013

(54) TECHNOLOGY FOR FLUSHING AND RELEARNING MAC ADDRESSES IN TELECOMMUNICATION NETWORKS

(75) Inventors: Alexander Kugel, Netanya (IL); Igor Shifrin, Petach-Tikva (IL)

(73) Assignee: ECI Telecom Ltd., Petach Tikva (IL)

( * ) Notice: Subject to any disclaimer, the term of this patent is extended or adjusted under 35 U.S.C. 154(b) by 236 days.

(21) Appl. No.: 13/093,384

(22) Filed: Apr. 25, 2011

(65) Prior Publication Data

US 2011/0280242 A1  Nov. 17, 2011

(30) Foreign Application Priority Data

May 13, 2010  (IL) .......................................... 205725

(51) Int. Cl.
*H04L 12/28* (2006.01)
(52) U.S. Cl.
USPC ............................ 370/255; 370/392; 370/400
(58) Field of Classification Search
CPC ..... H04L 45/66; H04L 12/4641; H04L 45/00; H04L 49/3009; H04L 12/4625
See application file for complete search history.

(56) References Cited

U.S. PATENT DOCUMENTS

| | | |
|---|---|---|
| 6,330,229 B1 | 12/2001 | Jain et al. |
| 2006/0023724 A1* | 2/2006 | Na et al. .................... 370/395.53 |
| 2010/0027543 A1* | 2/2010 | Rustagi et al. ................ 370/392 |
| 2010/0039961 A1* | 2/2010 | Tallet et al. .................... 370/256 |

FOREIGN PATENT DOCUMENTS

CN     101572668 A     11/2009

* cited by examiner

*Primary Examiner* — Jung Park
(74) *Attorney, Agent, or Firm* — Browdy and Neimark, PLLC

(57) ABSTRACT

A technique for performing a flushing process at a port of a network switch, where the flushing process comprises a flooding operation and an operation of relearning MAC addresses. In the method, these two operations are made independent, and the operation of relearning MAC addresses is started before termination of the flooding operation. An operation of forwarding packets to the relearned MAC addresses can be started before termination of the flooding operation.

4 Claims, 4 Drawing Sheets

FIG.1

| I/F | FLUSH STATUS |
|---|---|
| 0 | 0 |
| 1 | 0→1 |
| ... | ... |
| 127 | 0 |
| 128 | 0 |
| 129 | 0 |
| ... | ... |
| 255 | 0 |

| MAC | VPN | I/F |
|---|---|---|
| 00:11:22:33:44:55:55 | 1023 | 1 |
| 00:11:22:33:44:55:66 | 1023 | 2 |
| 00:11:22:33:44:55:77 | 1023 | 1 |
| 00:11:22:33:44:55:88 | 1023 | 2 |
| 00:11:22:33:44:55:99 | 1023 | 1 |
| ... | ... | ... |

FIG.3A

| MAC | VPN | I/F |
|---|---|---|
| 00:11:22:33:44:55 | 1023 | 1→2 |
| 00:11:22:33:44:55:66 | 1023 | 2 |
| 00:11:22:33:44:55:77 | 1023 | 1 |
| 00:11:22:33:44:55:88 | 1023 | 2 |
| 00:11:22:33:44:55:99 | 1023 | 1 |

FIG.3B

| MAC | VPN | I/F |
|---|---|---|
| 00:11:22:33:44:55 | 1023 | 2 |
| 00:11:22:33:44:55:66 | 1023 | 2 |
| 00:11:22:33:44:55:77 | 1023 | 1→129 |
| 00:11:22:33:44:55:88 | 1023 | 2 |
| 00:11:22:33:44:55:99 | 1023 | 1 |

TECHNOLOGY FOR FLUSHING AND RELEARNING MAC ADDRESSES IN TELECOMMUNICATION NETWORKS

FIELD OF THE INVENTION

The present invention relates to a technology of relearning MAC addresses in modern communication networks, more specifically—to a rationalized MAC flush technique.

BACKGROUND OF THE INVENTION

Relearning of MAC addresses (Media Access Control Addresses) is a well known procedure in modern communication networks, and usually it takes place when the network topology changes for any reason. For example, a path to some device having a MAC address 1 has changed, but that MAC address 1 has not yet been relearned with reference to the mentioned new path (so-called "MAC move" event). To relearn the MAC address 1 in association with the new path/new port of a switch, the previously learned information (about association of the MAC address 1 with the previous specific port) should be deleted, in other words "flushed" from that specific previous port. Let us call the step of deleting as step a). The decision to flush MACs is usually taken by Central Processing Unit CPU of the switch either as a result of detecting a change in the connectivity state of the logical interface (failure of attachment circuit AC, Tunnel, pseudo wire PW, etc.) or as a result of a request/message from a user (Element Management System EMS, Common Line Interface CLI, Network Management System NMS), or other network elements (TCN, CCN) for example a MAC Withdraw message, etc.

Then comes step b) flooding packets, addressed to the MAC address 1 of interest, though all relevant interfaces (logical/physical) of the switching device, and then step c)—upon receiving a packet from the source having MAC address 1, registering this MAC address 1 in association with that port of the switch, via which the packet has arrived to the switch.

There are two common presently known practices to perform the flooding:

1. The switch may scan its internal Forwarding Data Base FDB and remove all the flushed MAC's from the FDB one by one. In systems with a lot of learned MACs (100 k+) this may take a significant time, thus affecting connectivity of the service and of the switch.

2. Alternatively, the switch may enter the "flushing/flooding" mode for the service, where the steps (a) and (b) are combined together. During the flushing/flooding mode, the relevant MAC's will be removed from the FDB (either by ageing or by specific SW/HW/FW operations). Then, the switch may enter the combined "flooding/learning" state (steps (b) and (c)=learning). This approach may be more efficient than the approach 1, however it still has disadvantages. For example, during the "flushing/flooding" the switch will flood to all MACs even if these MACs arrive from a new virtual interface, i.e., "tries to be relearned". This will result in unnecessary flooding which in turn lengthens the process and may affect the service connectivity.

In practice today, the step (c) of real relearning is delayed till the end of the flooding. It is admitted by all the presently known techniques that the flooding and the relearning steps (b and c) cannot be effectively performed simultaneously. More accurately, if one or more MAC addresses have been relearned during the flooding operation, it is impossible to perform correct forwarding to these MAC addresses up to the end of the flooding operation.

Further it should be noted that, in real networks, not only MAC address 1 but many other MAC addresses may be associated with a specific port being currently flushed. In case that MAC address 1 "moves" to another port, other MAC addresses may need to remain registered at the discussed port; nevertheless, since usually all the information from the port is being flushed when one address is flushed, these "other" MAC addresses will be deleted. Moreover, both the MAC address 1 and these other MAC addresses must wait till the end of the flushing process including the flooding, and only then will they be learned and registered again.

Such "full flush" usually occurs when CPU of the switch retrieves the complete Forwarding Data Base (FDB) from NPU (Network Processing Unit, usually a chip associated with CPU) per each flush request. The learning/re-learning will be temporarily disabled during the flushing. As was mentioned, alternatively the CPU may precisely remove a number of relevant MAC addresses from the FDB. In any case, these operations are slow (10 s to 100 s of seconds), desynchronize FDB and affect other CPU-NPU communications (such as messages of IGMP and OAM).

A number of prior art documents try resolving problems of the MAC flush operation, for example:

U.S. Pat. No. 6,330,229B describes management of forwarding databases (FDB) in the case of link failures on bridges according to a spanning tree protocol, limits the propagation of notifications of topology change to only those parts of the network which are affected by the link failures. The technique also triggers partial flushing as opposed to complete flushing of FDB to relearn the sets of addresses associated with ports affected by the change in topology.

CN101572668A describes a technique for fast removal of MAC addresses from an interface being flushed. The method comprises storing all the MAC addresses corresponding to and learnt by interfaces, which need fast deletion, searching all the MAC addresses in the MAC table with MAC addresses to be deleted, and deleting the MAC addresses fast, by the microcode of a network processor. The solution shortens the deleting time of MAC addresses and the switching time of the circuit protection.

US2010027543A describes layer two MAC flushing/re-routing and proposes a solution for forwarding packets based on checking their destination address, address identifier and event identifier. The solution automatically identifies Change Topology Events and performs flooding of packets as a result. However, neither US2010027543, nor other above-mentioned documents provide any mechanism of optimized, instant flushing and/or relearning of MAC addresses.

OBJECT AND SUMMARY OF THE INVENTION

The object of the invention is accelerating, making immediate (instant) the process of flushing in a packet switching device (network switch), in order to start normal forwarding of packets by the device.

The object can be achieved by modifying a flushing process when taking place at a specific port of a network switch (a logical interface of VPN), namely by making the process of relearning MAC addresses in telecom networks instant.

It is known that the flushing process always comprises an operation of removing old MACs, flooding a port (logical/virtual interface) and an operation of relearning MAC addresses at the port for further forwarding packets via the port to the relearned MAC addresses.

As discussed above, a usual flush operation actually means a) deleting the previous information about a specific MAC address 1 at that port, b) flooding packets, addressed to the MAC address 1 of interest, through all interfaces (logical/physical) relevant to a specific service or VPN in the switch;

c) relearning, i.e., upon receiving a first packet from the source having MAC address 1, registering this MAC address 1 in association with that port of the switch, via which the packet has arrived to the switch.

Actually, to provide the instant (immediate) relearning of MAC addresses, the method comprises starting normal forwarding of packets to the MAC addresses relearned during a flooding operation—immediately after said addresses have been relearned. The technology proposed by the Inventors allows performing the normal forwarding during the "flushing/flooding" process, as well as in a normal (non-flushed) situation, It should be kept in mind that presently, when a port/a logical or virtual interface of a switching device/VPN is being flushed (which comprises deleting previously learnt addresses, flooding the port and then relearning addresses), the port's "data entry line" that exists in a forwarding data base (FDB) of the switch indicates the flushing status of the port/virtual interface. Such an indication presently prevents performing efficient forwarding (as a consequence of such relearning) of any addresses at that port during the flooding process.

In view of the above, there is proposed a method for performing a flushing process at a port (virtual interface), the flushing process comprises a flooding operation and an operation of re-learning MAC addresses, the method being characterized by making the above two operations independent, namely by starting the operation of relearning MAC addresses as well as an operation of forwarding the packets to the relearned addresses before termination of the flooding operation.

More specifically, to immediately start forwarding the packets to the MAC addresses relearned during the flooding operation, the method comprises performing the operation of flooding and the operation of relearning independently (separately, differentiated) from one another in a manner that prevents flooding of the packets to the relearned MAC addresses while the flooding operation is being continued.

It can be accomplished by performing said flooding operation and said re-learning operation respectively with reference to two artificially (by purpose) provided different instances/copies of one and the same specific port/interface; when the port is being flushed, the proposed two different instances allow making the flooding and the relearning operations independent.

The mentioned port (also called interface IF, or virtual switch interface VSI) can be, for example, a physical port or a logical port. A logical port/interface should be understood but not limited to: ports, attachment circuits, pseudo-wires, etc.

More specifically, for performing a flushing process at a port/interface of a network switch comprising a plurality of ports/interfaces, each port is considered to have two instances (one called 1st or main instance, and the other called 2nd or imaginary, fictitious instance). During the flushing state of the port, only one of said two instances has the flushing status and is used for the operation of flooding, while the other instance is free from the flushing status and is used for the operation of relearning and forwarding.

Actually, the mentioned effect is achieved since the re-learning and forwarding operation is performed as if it was performed with respect to an absolutely different port which has its unique number.

Physically, the MAC addresses can be learned at each one of these instances, but according to the rules described further.

The method comprises
assigning two unique indexes (for example, numbers), to each port of said plurality, one index for each instance of a port;
assigning two alternative states/statuses to the two respective instances; each instance of the port will have either "Flushing" or "Non-flushing" (or "Forwarding") state;
when a new MAC address is to be learned on a port, always learning it on the "Forwarding" (non-"Flushing") instance of the port;
in case a flushing process is required for a specific port, swapping the "Flushing/Forwarding" statuses between the two port instances (for the first time it may go without swapping);
Performing the operation of flooding for all MAC addresses learned on the instance which is presently in the "Flushing" state;
deleting addresses previously learned (on any of the instances) of said specific port by ageing, (as usually done in switches);
starting an operation of re-learning addresses before terminating the operation of flooding, and performing it as follows:
if a packet having a Source address unknown to a port to which the packet arrives (or a known address arrives to a new port different than said specific port to which it was previously assigned), learning said address on such instance of that new port, which is not in the "Flushing" state:
if a packet having a known (to FDB) address arrives at the same said specific port where it was registered before, re-learning (re-registering) its address at such instance of the specific port, which is not in the "Flushing" state (in our example, in the "Forwarding" state);
thereby separating said operation of flooding from said operation of relearning, thus accelerating the operation of relearning and the whole flushing process at said specific port, and
starting the operation of forwarding the packets before the end of the flooding operation, by using the port instance having the "Forwarding" status.

What actually happens in the described flooding process, is as follows: the "flooding continues for all relevant (i.e., relevant to the traffic service or the VPN of interest) MACs which haven't yet been re-learned. All relevant MAC's which have already been received during the "flooding", will be relearned and will not be flooded any more.

It should be noted that the mentioned two indexes of port instances of any port are unique (i.e., differ from one another and from indexes of any other port in the switch; both of said indexes are associated with one another and are supposed to be used, say by CPU or EMS, for serving one and the same said specific port. The two indexes may be accomplished as two linked entries in data base, for example in a Forwarding Data Base (FDB) of the switch, one of the entries being considered as a main or conventional entry and the other—as an additional or fictitious entry.

To reflect the two alternative instances of the port, one FDB entry of the port is always considered as "Forwarding", and the other as "Flushing" (say, by CPU). If the status of the port changes (either the port moves to the flushed condition, or back), the two instances mutually change their status (for example, by a command from CPU). To perform switching of the instances, the system may comprise CPU and a suitable NPU, FPGA or any other dedicated switching unit for changing status of the entries.

The proposed separation and acceleration of the learning/relearning operation allows alleviating a number of problems which occur in modern communication networks. For example, these problems may comprise:

ERP flushing, where traffic from different rings may enter one and the same switch, and where flushing of addresses learnt for one ring should not affect addresses learnt for another ring. The proposed flush method allows quickly relearning those MAC addresses which are to be re-learnt. For not flushing some MAC addresses at a specific port, the method may then allow differentiating MAC addresses (say, by indicating them per ring);

RSTP flushing, for example when receiving a requirement "flush all but me"

Flush in MPLS networks, where MAC withdraw messages are used for flushing on distant topology changes (for example PW redundancy, optimized MAC Address withdrawal, etc.).

In all the above-mentioned problems, the key issue is acceleration of the relearning operation—i.e., quick restoring and updating of the information flushed from the database (FDB) of the switch, and immediate beginning of normal, correct forwarding.

More specifically, the method for performing the flush (flushing) process at a port (interface IF, virtual switch interface VSI) of a network switch having a plurality of ports, may comprise:

providing a status table of the ports of said switch (which may be part of a forwarding data base FDB), providing in the status table, one conventional entry for a specific port of the switch providing, in the same status table, an additional (fictitious, alternative, second) entry for said specific port of the switch marking one of these specific port entries with the "Forwarding" state;

marking another entry of the specific port with the "Flushing" state ensuring the following behavior of the entries having the "Flushing" and "Forwarding" states, in case the flushing operation is required on said specific port of the switch:

the port's entry with the "Forwarding" state now acquires a "flushing" status/state, thereby allowing a) deleting (by ageing) addresses previously learnt by said specific port and b) flooding of packets (as usually accepted to do), while the alternative entry now acquires the "Forwarding" status/state;

thus using said additional entry as a substitute of the main entry for the re-learning operation at said specific port while said port is still being flooded, and as a reference for the forwarding operation.

Preferably, the method comprises providing the status table with the described additional entries for all ports of the switch, in addition to their respective main entries.

During the flush process, the additional entry will have a status alternative to the status of the main entry, and should serve as a substitute of the main entry. The additional entry allows relearning of any MAC address at our specific port of interest, and independently from the fact that the port is being flooded at that time. It goes without saying that any relearning is actually performed by registering, at the FDB, a necessary MAC address with association with a port of interest. In our case, it can be made whenever any packet arrives to the specific port while it is still in the flooding process, and the registration of MAC address of the packet may be performed in the FDB via the additional entry having the necessary association with said specific port. This way, the additional entry serves for MAC relearning during the flooding time at a specific port.

In practice, the ports' status table of the switch may comprise two portions—a first portion (A) may comprise all conventional (main) entries of all ports of the switch, while a second portion (B) may comprise a corresponding plurality of additional, fictitious entries of the same ports, wherein each conventional entry (Ai) being assigned to a specific port is linked to its associated fictitious entry (Bi) assigned to the same specific port.

In the frame of the method, the learning at the time when a specific port is under the "flush" process (at the "flush" status) may be performed as follows:

if a packet with a known (to the switch) MAC address arrives from a new source (via a different, new port/interface), a so-called MAC move will be performed, i.e. that MAC address will be registered to the new port using the main indication of the new port (say, it can be implemented using the new port's main entry, in the first portion (A) of the switch FDB;

if a packet with a known MAC address arrives to the switch from the same, previously known source (i.e., via the same known specific port/interface), the alternative instance (in the form of an alternative index marking an additional FDB entry) of that port is used, to perform the learning operation as if it was performed with respect to another port. In such a case, the learning operation is actually registration of the MAC address in association with the alternative index of the mentioned specific port. In practice, the registration may be performed using the alternative entry of that specific port, in the second portion (B) of the switch FDB.

According to another aspect of the invention, there is also provided a packet switching device capable of performing the method described above. In the switching device, the described ports' status tables (databases) and controllable address tables are organized in the FDB, and the suitable software and/or firmware is installed, so as to enable the switch to implement the above method. Various combinations of suitable FW/SW may be used within the network switch, and all the inventive operations can performed in the switch locally.

The packet switching device having a plurality of ports may comprise a Central Processing Unit CPU and a Packet Switching Module PSM in communication with one another, said PSM comprising a status data base of said ports and a forwarding data base FDB, wherein the FDB comprises two entries, having different indexes, for each of said ports, and wherein in case said specific port is in "flushing" status, one of said two entries of a specific port is adapted to serve for flooding, while the other of the entries is adapted to simultaneously serve for relearning MAC addresses and forwarding packets to the relearned MAC addresses.

There is also proposed the PSM for the switching device. Its implementations may be various, but it should comprise a status data base of the switch ports and a forwarding data base FDB, wherein the FDB comprises two entries with different indexes for each of said ports; the arrangement being such that, in case a specific port is to be flushed, the PSM is adapted to assign to one entry of the specific port a "flushing" status, so as to allow the entry having the "flushing" status to serve for flooding packets, while the other of the entries being adapted to simultaneously serve for relearning MAC addresses and forwarding packets to the relearned MAC addresses.

There may further be provided a software product comprising computer implementable instructions and/or data (such as FDB comprising address tables and port status tables) for carrying out the method according to the above description, the software product being stored on an appropriate computer readable storage medium so that the software is capable of enabling operations of said method when used in a computer or computer system. The computer in this specific case may be in the form of a switch control block CPU or a Packet Switching module associated with the CPU. Packet Switching module may comprise (but not limited to) an NPU (Network Processing Unit), FPGA or any other dedicated ASIC. CPU may also be part of such a dedicated ASIC.

Flushing requests to the CPU or NPU may arrive from EMS/NMS; these request may also be specific, not related to any topology changes. External requests for flush may arrive from an MPLS network, etc.

There may therefore be provided the following categories of protection: a method, a computer readable storage medium accommodating the software product, a Packet Switching Module (PSM) accommodating and capable of utilizing the software product, and a network switch (a packet switching device) capable of performing operations of the method and provided with suitable FW/HW. The FW/HW actually constitutes the PSM and preferably accommodates the proposed software product.

BRIEF DESCRIPTION OF THE DRAWINGS

The invention will be further described and illustrated with the aid of the following non-limiting drawings in which:

FIG. 1 schematically illustrates an example of a port status database/table 10 which modifies a conventional Forwarding Data Base FDB.

FIG. 2 (prior art) illustrates an example of a conventional, MAC addresses table 12 in FDB FIG. 3a and FIG. 3b illustrate two different cases of learning MAC addresses.

DETAILED DESCRIPTION OF PREFERRED EMBODIMENTS

Figure 4:
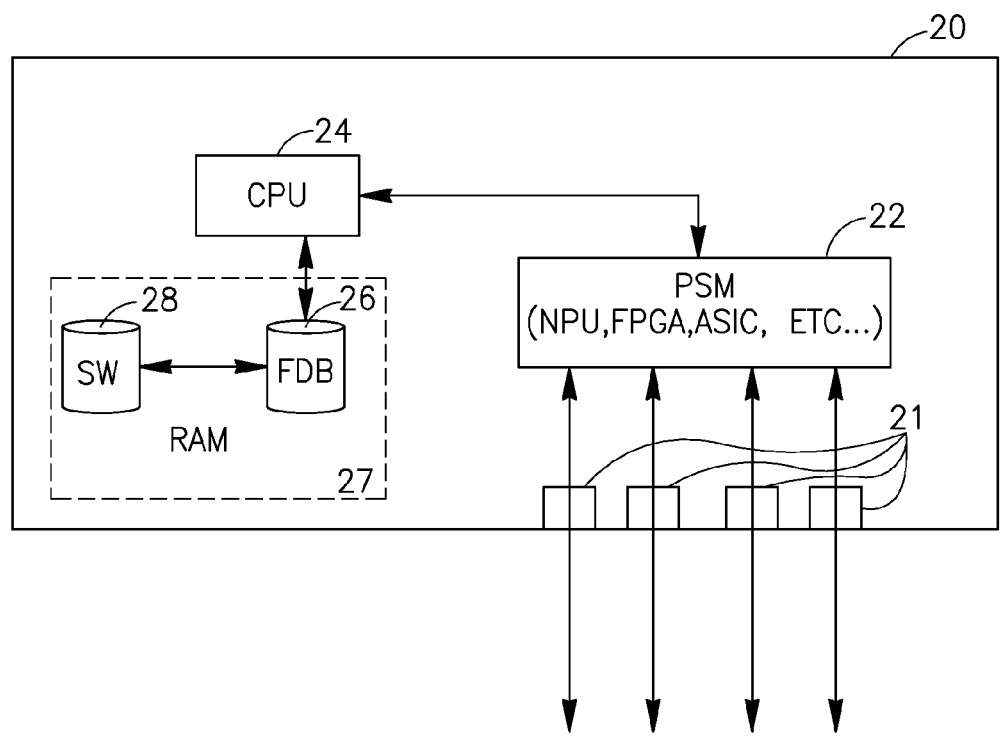
FIG. 4 is a schematic illustration of one embodiment of a packet switching device provided with capabilities to support the method according to the invention.

As explained in the summary, the Inventors propose separation/making independent the operation of flooding and the operation of (re)learning & forwarding in a packet switching device. It has become possible due to performing the flooding with reference to a main, "Flushing" instance of a specific port, while performing the operation of learning and forwarding by using an additional, "Forwarding" instance of that port.

The learning may comprise a) relearning addresses during a flush status of a port, and/or b) learning of a new address to a new port to which a packet with a new address arrives (it may happen during the flush status, too). It is also worth to note that if any registered address does not appear for a long time and thus does not confirm its registration in FDB, such address will be deleted there-from due to aging.

FIG. 1 schematically illustrates an example of a port status database/table 10 which modifies a conventional Forwarding Data Base FDB. The port status database 10 comprises two port status tables (a main table A and an additional table B), wherein each entry of the database 10 comprises an index (number) of a specific logical/virtual port and its flushing status. Actually, table B is a copy of table A, since the both tables relate to the same group of logical ports. However, the indexes of ports in table B are different; these numbers are just fictitious numbers of the same ports listed in table A. Table A comprises real port numbers 0 to 127 and forms a first bank of ports, while table B comprises fictitious port numbers 128 to 255 and forms a second (additional) bank of ports. At the beginning, in the normal course of operation, the flushing status of all the ports in both tables A and B may be the same ("0", non-flushing or forwarding). In case of flushing at a specific port—say, at port 1, —CPU or a dedicated logic unit of the switch updates status of that port in the main table A ("1", flushing), while keeps the status of that same port in table B as non-flushing or forwarding ("0"). As we bear in mind, port 1 in table B is labeled by number 129. The two related/linked entries of the same port are schematically indicated by a dotted curve.

FIG. 2 (prior art) illustrates an example of a conventional, MAC addresses table 12 in FDB, which shows how MAC addresses are learned and registered in the switch FDB at the beginning, each MAC address in association with a specific virtual private network VPN and a specific interface (virtual port).

The modified novel FDB, according to the invention, comprises not only the conventional MAC addresses table 20 (FIG. 2), but also a new, port status database 10 consisting of tables A and B (FIG. 1). The network switch (not shown) incorporating such FDB and the proposed software product (that enables performing the inventive method of flushing) will be modified and novel as well.

Let now the switch registers a request to flush all MACs registered on port 1. The status of the port in the sub-table A (FIG. 1.) will be updated with the value "1" which indicates the "Flushing" status of the port.

How forwarding of packets will be performed in the proposed modified switch? Let a packet with a MAC address arrives to the switch; it should be forwarded to a suitable port(s). As usual, the FDB is searched for the MAC address, and if found, it is checked for its associated VPN and virtual port (in the MAC addresses table 12, FIG. 2), and then for status of the assigned virtual port (Table A of database 10, FIG. 1). If the MAC address is found (say, it is MAC –99:11:22:33:44:55 in the first line of the MAC addresses table 12), and the flushing status of its associated port 1 is "1" (see table A of database 10), the packet will be flooded via all relevant ports of the switch except for the receiving port. Relevant ports should be understood as ports related to a specific VPN (Virtual Private Network used by a specific communication service). If the MAC address of the arrived packet is not found in FDB, the packet must be flooded (forwarded via all the relevant ports) since that is a rule for packets with unknown MAC addresses. The modified FDB preferably integrates there-inside both table 12 and table 10.

How learning of MAC addresses will be performed in the proposed modified switch after flushing the port 1?

FIG. 3a and FIG. 3b illustrate two different cases of learning MAC addresses.

FIG. 3a illustrates a "port move" event of one of the MACs which is "moved" to another (non-flushed) port. The FIG. 3a shows the modified MAC addresses table 14, which is formed from table 12 of FIG. 2, where the first line is slightly changed due to the port move. Suppose that, due to some change in the network topology, a packet with MAC address 00:11:22:33:

44:55 known to the switch as related to a specific VPN arrives via a new port (I/F) 2 and not via the previously learned port 1. Upon searching in FDB for MAC and VPN, the first line of table 12 will be found and the registered port (I/F) will now be changed from 1 to 2 (see the first line in the table 14). This event of changing the port is called a MAC move event, and it is illustrated in the first line of table 14.

FIG. 3b illustrates the process of the relearning of a MAC address on the port being flushed. In other words, FIG. 3b shows another modification 16 of table 12, when a packet with a known MAC address arrives via the same flushed port (the port already registered in the FDB's table 12 in association with that MAC address and a specific VPN, and that port is in its flushing status (table 10)). It is exactly one of the cases which the Inventor takes care of, to accelerate the MAC relearning operation.

Let the MAC address is 00:11:22:33:44:77 (third line of the table 20") and it arrives from the port 1. Upon searching the FDB the MAC will be found at the same port entry, and upon revealing that the port entry is under flushing, the re-learning operation will be initiated. The port index will be replaced in table 16 with its corresponding alternative index (taken from table B of the status database 10), thus accomplishing the relearning operation, but in association with the alternative port index. In this specific example, the port index 1 will be changed to port number 129. We keep in mind, however, that port number 129 is known by CPU as a substitute of the port number 1.

Now, if a packet with the mentioned MAC address is to be forwarded, the packet will be searched in FDB for MAC, VPN, port number. Upon finding the fictitious port index (number) 129, the packet will be forwarded via the original port 1, but with reference to its fictitious index 129.

It goes without saying, that if any MAC address which is registered in the table 12 does not appear in arriving packets for a long time, it may be (and will be) erased from the table due to aging.

CPU of the switch preferably manipulates the port status tables. The Packet Switching HW (PS Module) preferably performs all the necessary forwarding, flooding and relearning.

FIG. 4 schematically illustrates an exemplary structure of a data packet switching device 20 capable of performing the proposed method. Ports or interfaces (physical, logical, virtual etc.) of the switching device are schematically marked 21. The switch 20 comprises an internal packet switching module 22 monitored and controlled by a control processing unit CPU 24 being in communication with a packet switching module PSM 22 which comprises suitable HW/FW means, such as NPU or ASIC or FPGA (programmable). The CPU 24 incorporates within it a forwarding data base FDB 26 and the proposed software product SW 28 which allows operation of the CPU according to the proposed method. The software product SW 28 and the FDB 26 are located on a RAM 27. The SW 28 is in interaction with two data bases within the FDB 26: a ports' status database 10 and a MAC addresses table 12. The CPU 24 is in communication with the ports via the PSM 32, and with external control systems, for example an Element Management System EMS and further to NMS (Network Management System) for exchanging information and instructions.

The proposed implementation is just an example; one may implement the algorithm by a single ASIC without CPU; etc.

Figure 5:
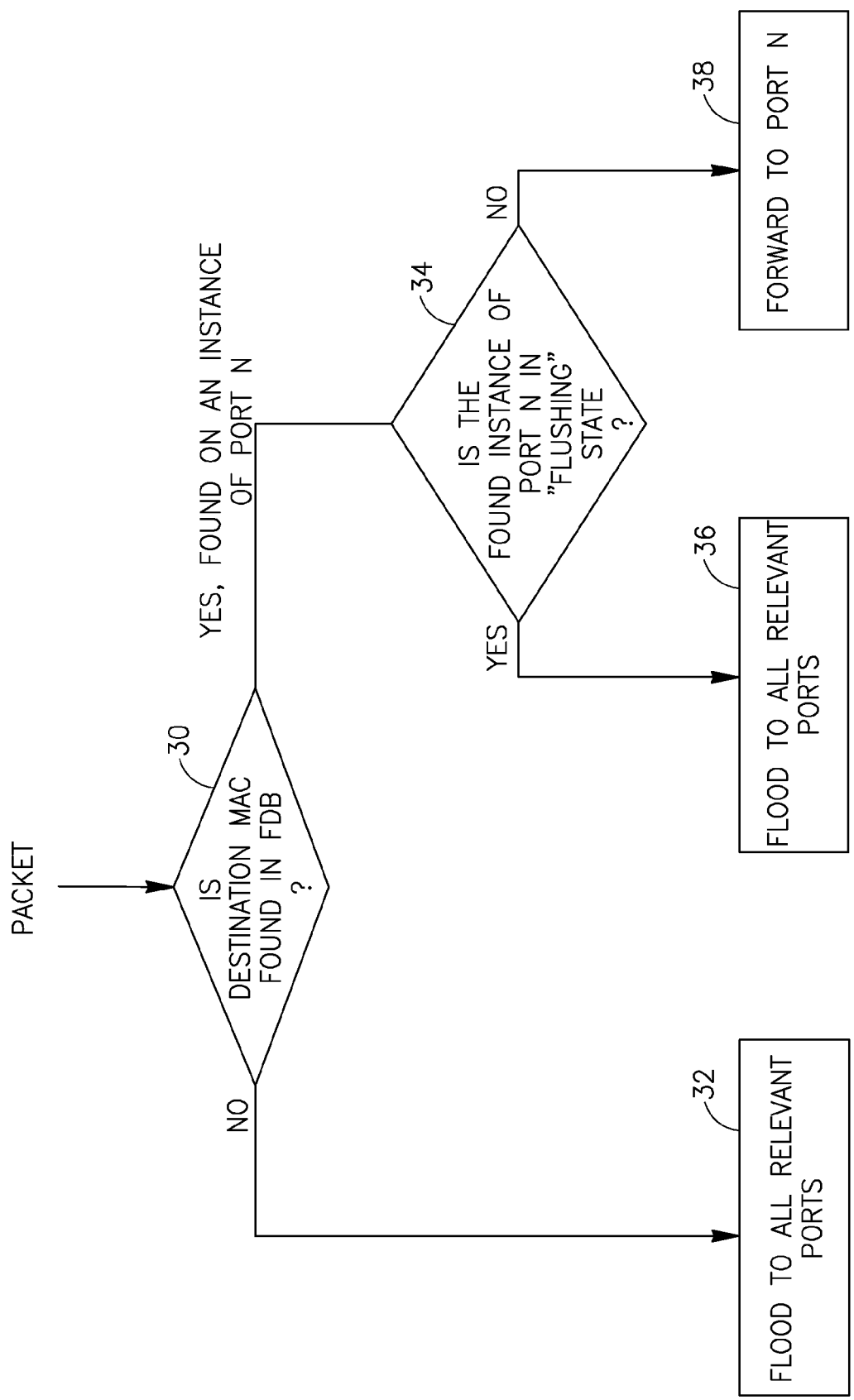
FIG. 5 schematically illustrates a flow chart of the proposed algorithm for the forwarding process in the switching device.

FIG. 5 shows how the proposed packet forwarding process is performed. The destination MAC address of a packet arriving to a switch is scanned to check whether it is already registered in the Forwarding Data Base FDB of the switch (block 30). If not, the packet will be flooded (block 32) to all ports relevant to the service/VPN to which the packet belongs. If the MAC address is found in the FDB, in an instance/entry/indication associated with port N, that entry N is checked for being in the "flushing" state (block 34). If the port is indeed in the flushing state, the packet will be flooded (block 36) to all relevant ports associated with the specified VPN. If not, the packet will be normally forwarded to the port N (block 38).

Figure 6:
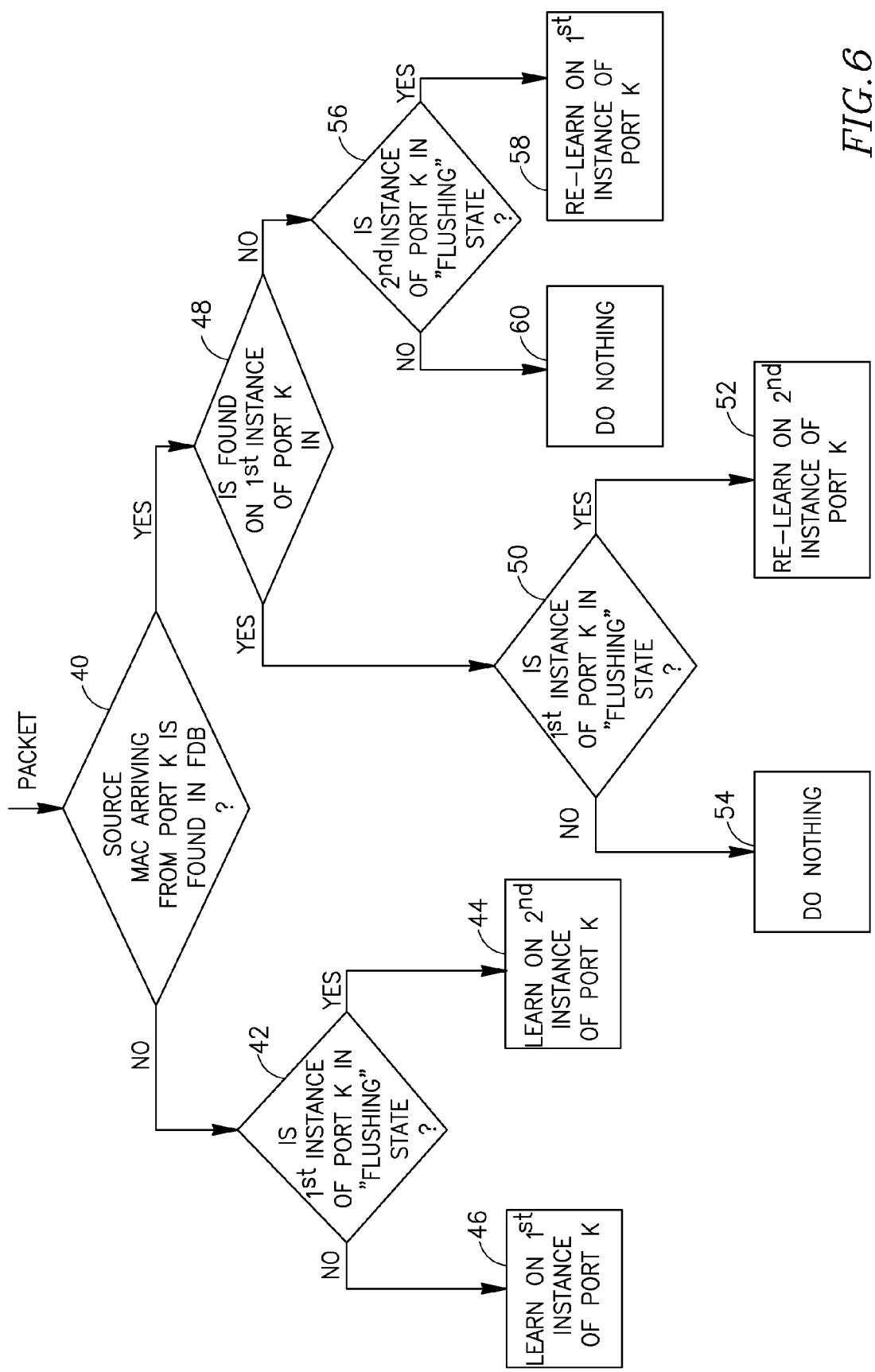
FIG. 6 schematically shows one version of the proposed algorithm for fast learning of MAC addresses in the switching device.

FIG. 6 schematically presents an example of a newly proposed method for accelerated MAC learning, where two instances (main and additional) are provided for each port in FDB. Block 40 checks whether the source MAC address of a packet, received at a switch via port K, is registered in FDB. Let there is no such a registration. We then check whether the first (main) instance/entry/indication of port K is in the "flushing" state (block 42). If yes, the MAC address of the packet will be learned on the second (additional, fictitious) instance of the port K (block 44). The forwarding will be thus performed using the $2^{nd}$ instance. If port K is in its normal state, the MAC address will be learned on the main/first instance of the port (block 46), and the forwarding will be performed using the $1^{st}$ instance. It is seen that the forwarding will be performed using the instance which is in the normal (non-flushing) state.

Alternatively, in case the MAC address of the arriving packet is found in the FDB (block 40), the method requires checking whether it is registered in the first (main)) instance of port K (block 48). If yes, we have to differentiate by which of the two provided instances it is registered, and act accordingly. In case the MAC address is found on the main (first) instance of port K, and that instance indicates that port K is in the "flushing" state (block 50), that instance is useless for relearning the address and the address will be relearned at the second (fictitious) instance of port K (block 52). If the main instance is in its normal state, there is no need to change the registration which already exists (block 54). However, in case that the MAC address is found on the second instance (block 48) and this instance shows that the port K is in the "flushing" state (block 56), it means that the port has changed its state again, and that there is now a need to relearn the MAC address on the alternative, first instance of port K (block 58). If the second instance is not in the flushing status, it means that the situation remains stable after the first flush of port K and that nothing should be changed in the existing registration of the MAC address (block 60). As above, the forwarding is performed according to the instance being in the non-flushing status. If yet a next flush required in the port, the two port instances swap their statuses.

It should be appreciated that other modifications of the proposed method, of the software product with a modified FDB, and of the switch capable of performing the method may be proposed and should be considered part of the invention as far as defined by the claims which follow.

The invention claimed is:

1. A method for performing a flushing process at a port of a network switch, wherein the flushing process comprises at least two operations being a flooding operation and an operation of relearning MAC addresses; the method comprises making said two operations independent of each other, starting the operation of relearning MAC addresses before termination of the flooding operation, the method further comprises starting an operation of forwarding packets to the relearned MAC addresses before termination of the flooding operation, performing said flooding operation and said relearning operation respectively with reference to two artificially provided different instances of said port being flushed, thereby making said two operations independent and preventing flooding of the packets to the relearned MAC addresses while the flooding operation is in progress, and wherein for performing the flushing process at said port of a network switch comprising a plurality of ports, the method comprises assigning said two different instances to each port of said plurality, one instance being a main instance, while another being an additional instance, in case the flushing process is required for a specific port, declaring a "flushing" status only for one of the instances of said specific port;

performing the flooding operation using the instance being in the "flushing" status; and performing the operations of relearning and the operation of forwarding using the instance not being in the "flushing" status.

2. The method according to claim 1, further comprising:

performing the operation of relearning MAC addresses as follows:

if a packet having a Source MAC address arrives to a new port to which it was not previously assigned, relearning said MAC address using the new port's instance being not in the "flushing" status; and if a packet having a known Source MAC address arrives to the same said specific port where it was registered before, relearning said known MAC address using the said specific port's instance being not in the "flushing" status; performing the operation of forwarding packets by using only the instances being not in the "flushing" status, thereby separating and making independent said operation of flooding and said operation of relearning, thus accelerating the operation of relearning and the whole flushing process at said specific port.

3. A method for performing a flushing process at a port of a network switch, wherein the flushing process comprises at least two operations being a flooding operation and an operation of relearning MAC addresses; the method comprises making said two operations independent of each other, starting the operation of relearning MAC addresses before termination of the flooding operation, the method further comprises:

starting an operation of forwarding packets to the relearned MAC addresses before termination of the flooding operation providing a status table of the ports of the switch, providing, in the status table, a main entry for a specific port of the switch, bearing a main index of said port;

providing, in the status table, an additional entry for said specific port of the switch, said additional entry having an additional index of that same specific port; and providing the following behavior of the main entry and the additional entry in case the flush process is required on said specific port of the switch:

one of said entries of the specific port acquires a "flush" status, while the other entry has a status alternative to said "flush" status;

using the entry having said alternative status, as a substitute of the "flush" status entry, for the MAC relearning operation at said specific port while said port is being flooded; and in case another flush is required at the same port, mutually exchanging status of the two entries.

4. A packet switching device capable of performing the method according to claim 1.

* * * * *